(12) United States Patent
Kleemann et al.

(10) Patent No.: US 11,896,919 B2
(45) Date of Patent: Feb. 13, 2024

(54) FILTER DEVICE FOR THE FILTRATION OF GASES CONTAMINATED WITH PARTICLES

(71) Applicant: HYDAC FLUIDCARECENTER GMBH, Sulzbach/Saar (DE)

(72) Inventors: Daniel Kleemann, Alsting (FR); Martin Freidinger, Saarbruecken (DE); Jörg Michael Wendels, Saarbruecken (DE); Christophe Hainka, Spicheren (FR); André Michael Schneider, Mandelbachtal (DE)

(73) Assignee: HYDAC FLUIDCARECENTER GMBH

( * ) Notice: Subject to any disclaimer, the term of this patent is extended or adjusted under 35 U.S.C. 154(b) by 717 days.

(21) Appl. No.: 16/981,398

(22) PCT Filed: Mar. 11, 2019

(86) PCT No.: PCT/EP2019/055951
§ 371 (c)(1),
(2) Date: Sep. 16, 2020

(87) PCT Pub. No.: WO2019/179799
PCT Pub. Date: Sep. 26, 2019

(65) Prior Publication Data
US 2021/0023490 A1 Jan. 28, 2021

(30) Foreign Application Priority Data
Mar. 19, 2018 (DE) ..................... 10 2018 002 314.2

(51) Int. Cl.
*B01D 46/00* (2022.01)
*B01D 50/00* (2022.01)
(Continued)

(52) U.S. Cl.
CPC ......... *B01D 36/02* (2013.01); *B01D 46/0002* (2013.01); *B01D 46/58* (2022.01);
(Continued)

(58) Field of Classification Search
CPC .... B01D 46/0002; B01D 46/66; B01D 46/70; B01D 46/72; B01D 50/00
See application file for complete search history.

(56) References Cited

FOREIGN PATENT DOCUMENTS

| CN | 205127649 | | 4/2016 |
|---|---|---|---|
| CN | 205216387 U | * | 5/2016 |

(Continued)

OTHER PUBLICATIONS

International Search Report (ISR) dated Jun. 24, 2019 in corresponding International Application No. PCT/EP2019/055951.

*Primary Examiner* — Robert A Hopkins
(74) *Attorney, Agent, or Firm* — WENDEROTH, LIND & PONACK, L.L.P.

(57) ABSTRACT

A filter device is for the filtration of gases contaminated with particles, such as welding gases, in particular produced in manufacturing processes using 3D printers in a production room (52). The filter device has a filter circuit having at least one filter element (55, 56), which filters the particles from the gas. At least a part of those particles get from this filter element (55, 56) into an assignable receptacle (59). The particles within a back-flushing process get into the respective receptacle (59). At least one further filter circuit has at least one further filter element (NF1, NF2 that filters a fluid having the particles obtained at the back-flushing process.

24 Claims, 14 Drawing Sheets

(51) Int. Cl.
 *B01D 36/02* (2006.01)
 *B01D 46/58* (2022.01)
 *B01D 46/71* (2022.01)
 *B22F 10/77* (2021.01)
 *B22F 12/70* (2021.01)
 *B01D 46/72* (2022.01)
 *B01D 46/70* (2022.01)
 *B33Y 10/00* (2015.01)
 *B22F 10/00* (2021.01)
 *B22F 10/28* (2021.01)
 *B22F 10/32* (2021.01)

(52) U.S. Cl.
 CPC ............. *B01D 46/70* (2022.01); *B01D 46/71* (2022.01); *B01D 46/72* (2022.01); *B01D 50/00* (2013.01); *B22F 10/77* (2021.01); *B22F 12/70* (2021.01); *B01D 46/0005* (2013.01); *B01D 2273/28* (2013.01); *B22F 10/00* (2021.01); *B22F 10/28* (2021.01); *B22F 10/32* (2021.01); *B33Y 10/00* (2014.12)

(56) References Cited

FOREIGN PATENT DOCUMENTS

| | | |
|---|---|---|
| DE | 20 2008 005 672 | 9/2009 |
| DE | 10 2009 006 878 | 8/2010 |
| DE | 10 2014 206 329 | 10/2015 |
| DE | 10 2015 017 026 | 7/2017 |
| JP | 2017209640 A * | 11/2017 |

* cited by examiner

FILTER DEVICE FOR THE FILTRATION OF GASES CONTAMINATED WITH PARTICLES

FIELD OF THE INVENTION

The invention relates to a filter device for the filtration of gases contaminated with particles, such as welding gases, which are in particular produced in manufacturing processes using 3D printers in a production room. The filter device has a filter circuit having at least one filter element, which filters the particles from the gas. The particles at least partially get from this filter element into an assignable receptacle.

BACKGROUND OF THE INVENTION

Filter devices of this type are known, cf. DE 10 2014 206 329 A1. The filtration of gases contaminated with particles requires considerable technical and economical effort, if there is a high particle contamination, as is very often the case with flue gases. Because of large quantities of particles deposited on the filter material of the used filter element, rapidly blocking of the filter element is caused, so that sufficiently long filter lifetimes cannot be achieved. Such problems are more prevalent in flue gases, such as the welding fumes produced by 3D metal printers. In selective laser sintering, as known as the SLS process (DE 10 2015 017 026), powdery, chemically pure metal particles are applied in layers and then fused using a high-power laser. This process is done in a protective gas atmosphere of argon or nitrogen existing in the installation space, because the presence of oxygen would not only impair the quality of the welding process, but would also pose a high safety risk due to the associated fire and explosion hazard. Equally critical and dangerous situations occur during the handling and disposal of the particles accumulated in the receptacle, which can react explosively on contact with oxygen, for instance from ambient air. To counteract this hazard, the solution known from DE 10 2014 206 329 A1 provides for shielding the separated particles by covering the separated particles with non-oxidizable particles, for instance with quartz, sand or similar materials. On the one hand, the achieved shielding is not sufficiently safe. On the other hand, it is difficult to introduce the material, such as sand, into the receptacle without introducing air.

SUMMARY OF THE INVENTION

Based on this state of the art, the invention addresses the problem of providing a filter device of the type mentioned at the beginning, which filter device can be operated in an economical and a particularly safe manner.

According to the invention, this problem is basically solved by a filter device having, as an essential feature of the invention, the particles within a back-flushing process getting into the respective receptacle and t at least one further filter circuit with at least one further filter element, which filters a fluid containing the particles obtained in the backwashing process. The regeneration of the respective filter element by backwashing and the longer lifetimes that then can be achieved result in an economical operation of the filter. Because, in addition to the at least one gas filter element filtering the raw gas, a further filter circuit is provided having at least one fluid filter element filtering a fluid having the separated particles, also the safety risks associated with the handling and disposal of the separated particles are eliminated. In contrast to the aforementioned state of the art, where a more or less dense covering of the particles by sand or the like is provided, in the invention the particles are absorbed in the fluid of the further filter circuit. In a fluid, such as white oil, the particles are enclosed by the fluid in such a way that the respective fluid filter is completely inserted and can therefore be handled without any risk.

In advantageous embodiments, at least one pressure accumulator is provided for the backwashing process, which pressure accumulator can be pressurized with a gas of a pre-determinable pressure by a compressor device. The gas originates from the clean side of a supply circuit for the production room, and in reversal of the usual filtration direction initiates backwashing at the respective filter elements. This arrangement allows the backwashing process to be carried out independently of the system pressure of the supply circuit of the production room, and thus, is particularly effective.

Advantageously the arrangement is such that at least one main filter is connected to the supply circuit for the production room. The filtrate side of this main filter supplies the clean side at the inlet of the production room. The unfiltered side of this main filter is connected to the filtrate side of the respective filter element.

The respective one filter is a gas filter, and the filter of the further filter circuit is a fluid filter, in particular an oil filter.

Particularly advantageously, the arrangement is such that, in order to passivate the respective receptacle and preferably the respective gas filter associated, pressure from the pressure accumulator acts at least on one fluid filter, The fluid, in particular in the form of white oil, of that fluid filter, cleaned of particles, gets at least into the receptacle and preferably into the filter housing containing the respective gas filter.

For filling the respective receptacle and preferably the respective assignable storage housing of the gas filter with fluid, the arrangement is advantageously such that the compressor device applies a vacuum to these components.

In particularly advantageous embodiments, two gas filters having the respective assigned receptacle are arranged as pre-filters upstream of the main filter. The unfiltered sides of these gas filters can be connected to the dirt side of the supply circuit. Two fluid filters can be connected together to at least one gas filter. As a result, each gas filter can be back-flushed separately, so that the construction process in the production room can continue without interruption.

For this purpose, cleaned fluid can be brought from the filtrate side of the respective fluid filter into the respective pre-filter, and the fluid contaminated with the particles of the respective pre-filter can be brought to the unfiltered side of the respective fluid filter.

To replace the filter element of a fluid filter, its fluid can be drained from the associated filter housing.

In advantageous embodiments, for the production room a blow pump is installed in the supply circuit downstream of the main filter, and a gas cooler is installed downstream of this pump. A supply device is present that feeds the gas, preferably in the form of a protective gas, such as nitrogen or argon, into the supply circuit.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
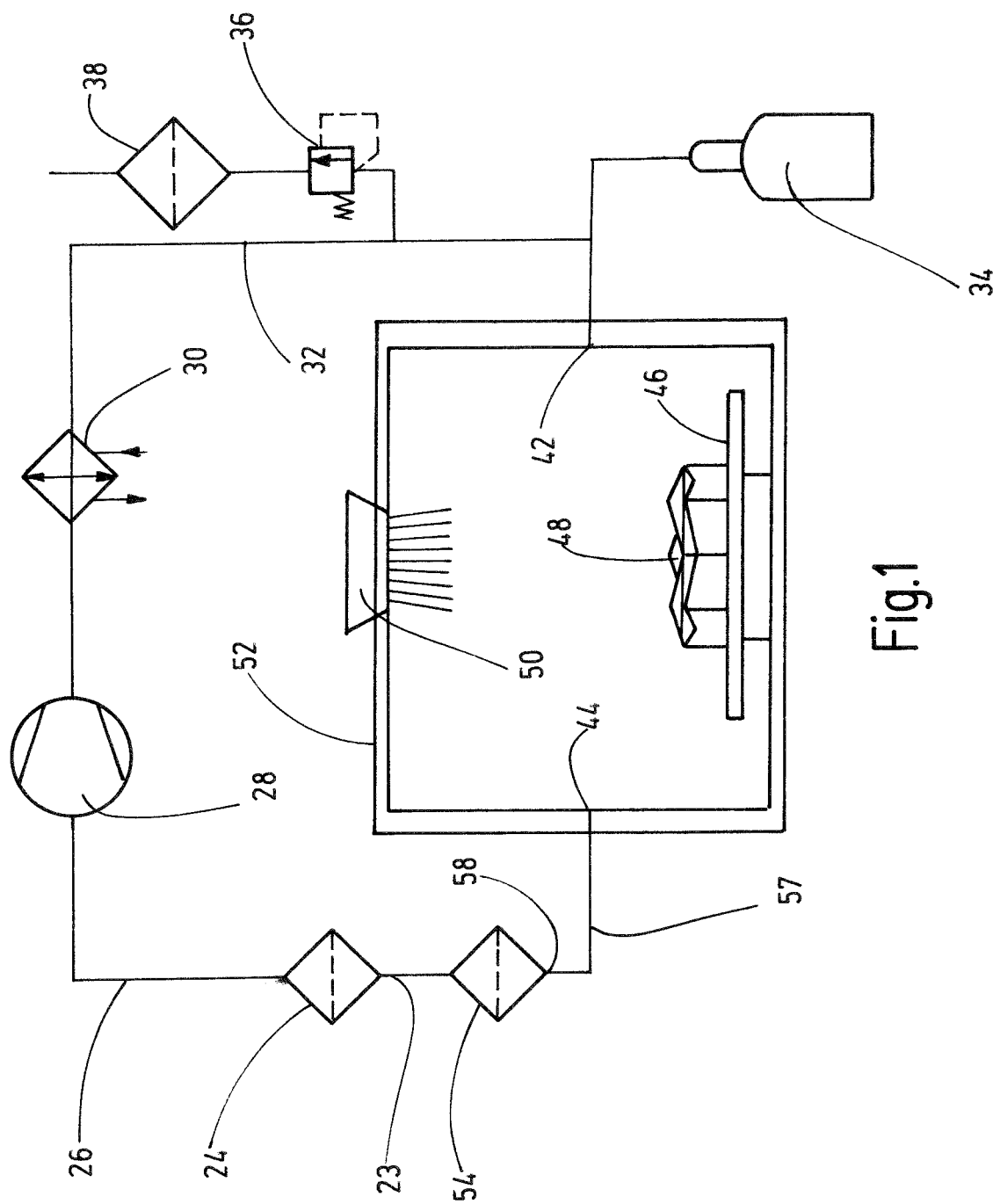
FIG. 1 is a highly schematically simplified diagram of a production room of a 3D printer having a supply circuit, shown with symbols with a filter device according to an exemplary embodiment of the invention.
Figure 2:
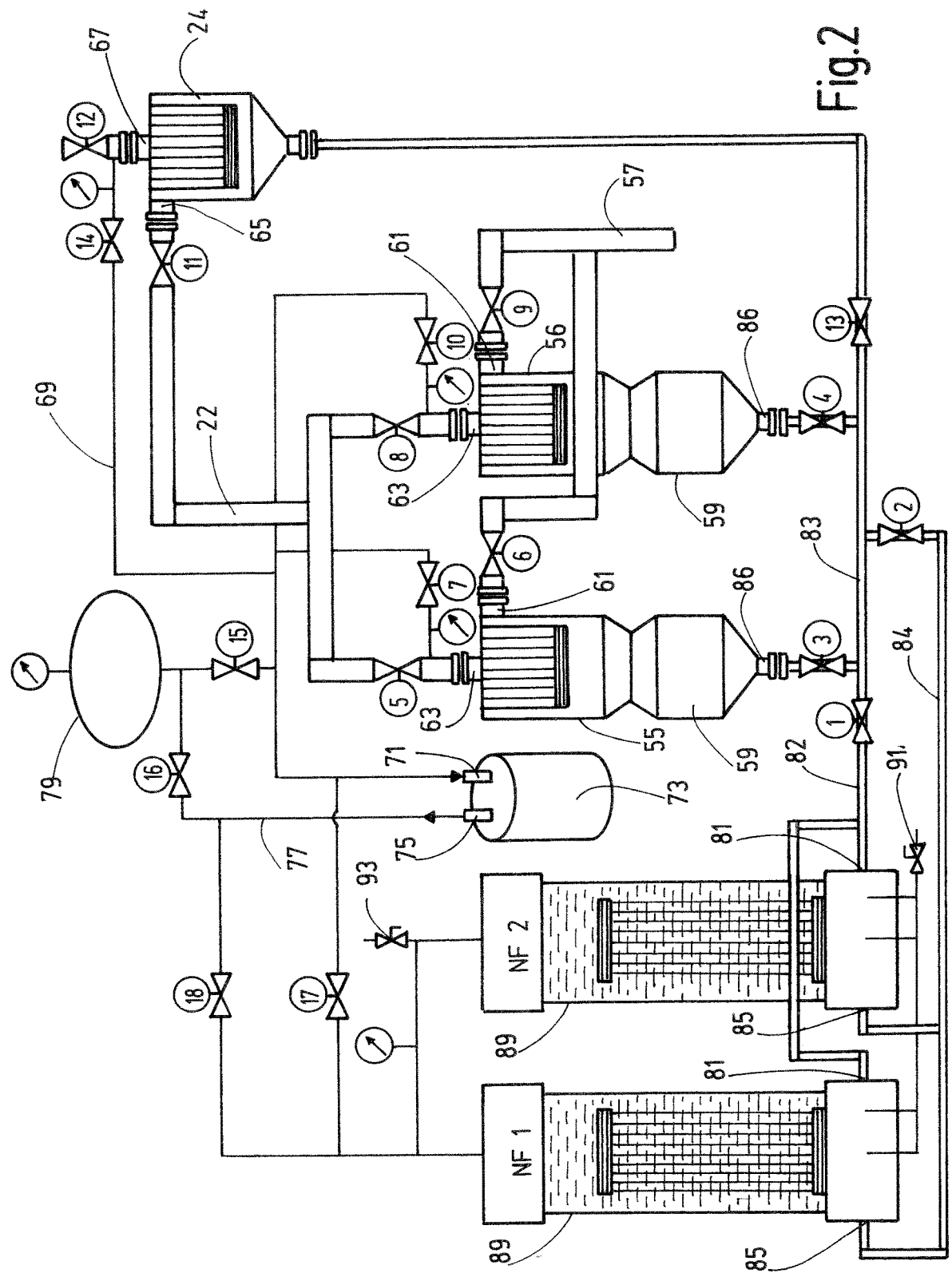
FIG. 2 is a schematic and highly simplified diagram of a filter device according to an exemplary embodiment of the invention, wherein the fluidic interconnection of the various components of the embodiment is shown schematically simplified.

FIG. 1 shows the supply circuit of a 3D printer, which operates according to the principle of selective laser sintering (abbreviated: SLS process). This is a type of powder printing, in which powdery, chemically pure metal particles are used. The particles are applied in layers and then fused using a high-power laser in a protective gas atmosphere. In this way, metal objects can be produced with great precision. The welding fumes or welding smolder produced in this process and discharged from the production area of the printer together with the protective gas, is heavily contaminated with particles of the metal powder. This heavy contamination results in blocked filter material after short operating times, requiring frequent filter changes. A filter device in accordance with the invention is assigned as a pre-filter device 54 to the concerning 3D printer, the production room 52 of which is only indicated schematically in FIG. 1. The production room 52 has a lowerable printing table 46 that is usual for printers of this type, on which an object 48 is formed by fusing powder layers applied by f the radiation of a high-power laser 50. This fusing is done in the atmosphere of a protective gas, such as argon or nitrogen, which is supplied to the production room 52 via a protective gas inlet 42 and discharged via a protective gas outlet 44. From the outlet 44, the protective gas together with the welding fumes produced during the printing process is conveyed as raw gas via a raw gas pipe 57 to the raw gas inlet 58 of the pre-filter device 54. From there, the filtered clean gas goes through a clean gas pipe 23 to a main filter 24, the outlet of which main filter leads through a suction pipe 26 to a blow pump 28. This generates a negative pressure for the operation of the pre-filter device 54 and of the main filter 27 as suction filter.

In suction filter operation, the clean gas returns from the blow pump 28 via a gas cooler 30 and a return pipe 32 to the protective gas inlet 42 of the production room 52, after the gas heated by the previous welding process has been again cooled in the gas cooler 30 to the desired working temperature. A protective gas reservoir 34 and a pressure relief valve 36 are connected to the return pipe 32.

A filter 38 for gas escaping via the valve 36 is installed downstream of the pressure relief valve 36, which is used as an overpressure protection for the supply circuit.

FIGS. 2 to 14 show further details of the pre-filter device 54. It has two separate pre-filters, the first pre-filter 55 and the second pre-filter 56. Through the raw gas pipe 57, a raw gas from the raw gas outlet 44 of production room 52 and contaminated with particles can be routed via a blocking device 6 or 9 to the unfiltered side 61 of the first pre-filter 55 and of the second pre-filter 56, respectively. In doing so, the raw gas flows tangentially to the inner wall of the housing of the pre-filters 55, 56, such that a cyclone effect is created. By the cyclone effect, coarse dirt particles, deposited on the filter material of the pre-filters 55, 56, are detached and drop down into a receptacle 59 sealingly attached to the bottom of the pre-filters 55, 56. The filtrate sides 63 of the pre-filters 55, 56 are connected via a shutoff device 5 or 8 to the clean gas pipe 22, which leads via a further shutoff device 11 to the dirt side 65 of the main filter 65, which is formed as a secondary filter or fine filter. The suction pipe 26 of the supply circuit is connected to the filtrate side 67 of the main filter 24 via a shutoff device and leads via the suction blower 28, not shown in FIGS. 2 to 14, and the gas cooler 30 to the return pipe 32, which forms the clean gas side of the supply circuit. Furthermore, the filtrate side 67 of the main filter 24 is connected to the suction side 71 of a compressor 73 via a shutoff device 14 and a supply pipe 69. The pressure side 75 of the compressor 73 is connected to a pressure accumulator 79 via a pressure pipe 77 and a further shutoff device 16, such that the pressure accumulator 79 is chargeable by the compressor 73 using clean gas coming from the supply pipe 69.

An additional bypass filter circuit has two oil filters, designated by NF1 and NF2, for the filtration of white oil. The filtrate sides 81 of the oil filters NF1 and NF2 can be connected to a connection pipe 83 via a feed pipe 82 and via a shutoff device 1. The connection pipe 83 can also be connected to the dirt side 85 of the first and second oil filters NF1 and NF2 via a further shutoff device 2 and a return pipe 84. Via shutoff devices 3 and 4, located at the bottom sided outlet 86 of the receptacles 59, also the receptacles 59 of the pre-filters 55 and 56 are connectable to the connection pipe 83. The system is completed by connections of the pressure accumulator 79 to the supply pipe 69, made possible via a shutoff device 15, and also to the filtrate sides 63 of the pre-filters 55 and 56 via the shutoff devices 7 and 10. For pressure relief, the housing of the main filter 24 can be connected to the connection pipe 83 via a further shutoff device 13. The filter housings 89 of the oil filters NF1 and NF2 are connected to the pressure pipe 77 via further shutoff devices 17 and 18. A drain valve 91 allows graining the system. Furthermore, pressure sensors without numerals are arranged on the pressure accumulator 79, on the filter housing 89 of the oil filters NF1 and NF2, on the unfiltered sides 61 of the pre-filters 55 and 56 and on the filtrate side 67 of the main filter 24.

In FIGS. 3 to 14, which show different operating states, active pipe sections are marked using a thick line.

Figure 3:
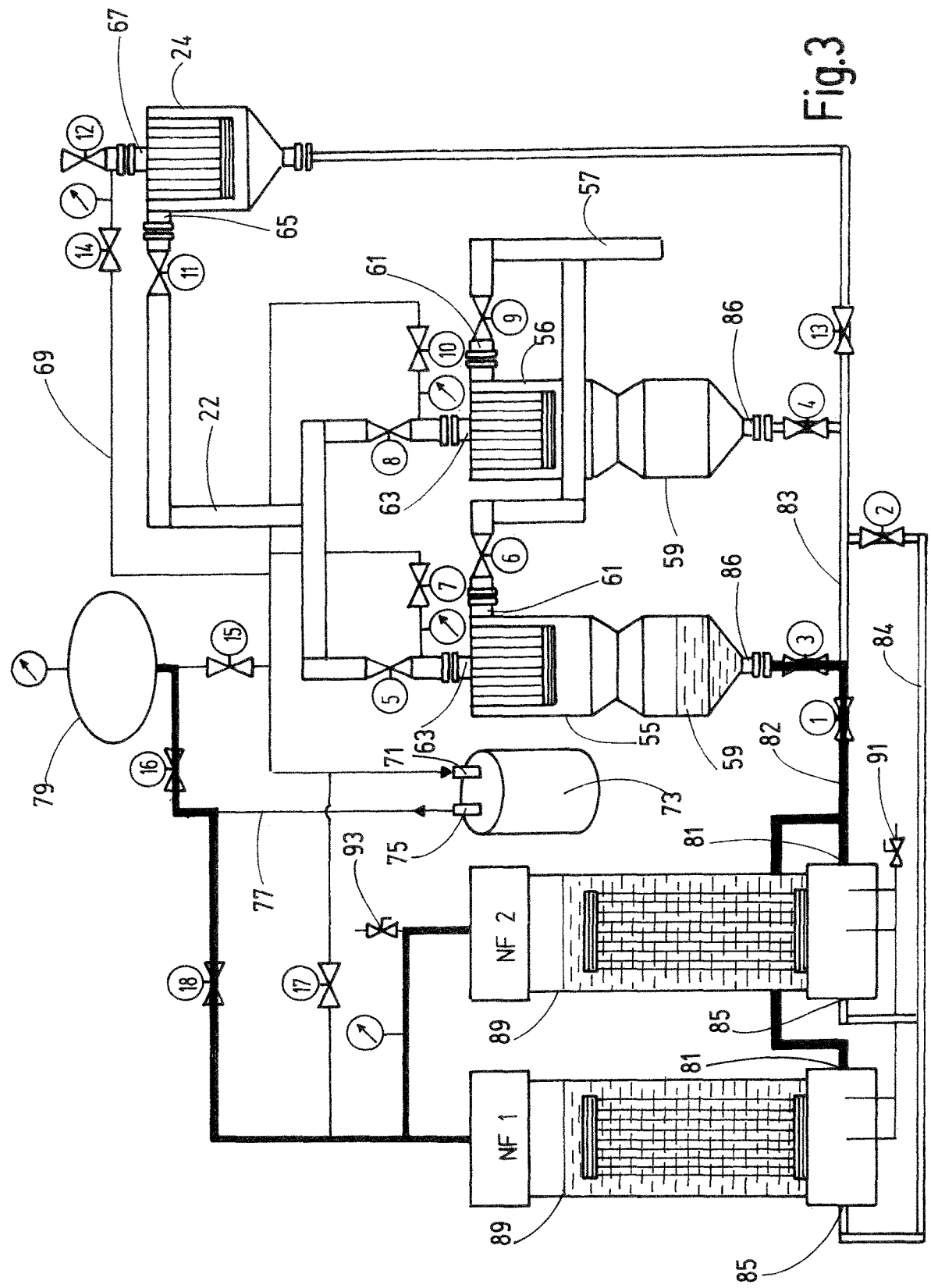
FIG. 3 is a schematic and highly simplified diagram of the filter device of FIG. 2, wherein a first mode of operation is indicated using bold lines.

FIG. 3 shows an operating state in which, of the pre-filters 55 and 56, the pre-filter 56 shown in the figure on the right is in filtration mode, wherein the shutoff devices 9 and 8 are open such that unfiltered matter flows tangentially into the housing of the pre-filter 56. The resulting cyclone effect has a cleaning effect that prevents the housing wall from being contaminated by adhering particles. The filtrate exits via the open shutoff device 8 and reaches the main filter 24 via the clean gas pipe 22 and the open shutoff device 11. The shutoff devices 6 and 5 on the first pre-filter 55 are closed in this process. At the same time, the housings 89 of the oil filters NF1 and NF2 are pressurized with pressure from the pressure accumulator 79 via the open shutoff devices 16 and 18, and the shutoff devices 1 and 3 are open. As a result, the receptacle 59 of the pre-filter 55, which is not in filtration mode, is filled with white oil from the filtrate side 81 of the oil filters NF1 and NF2.

Figure 4:
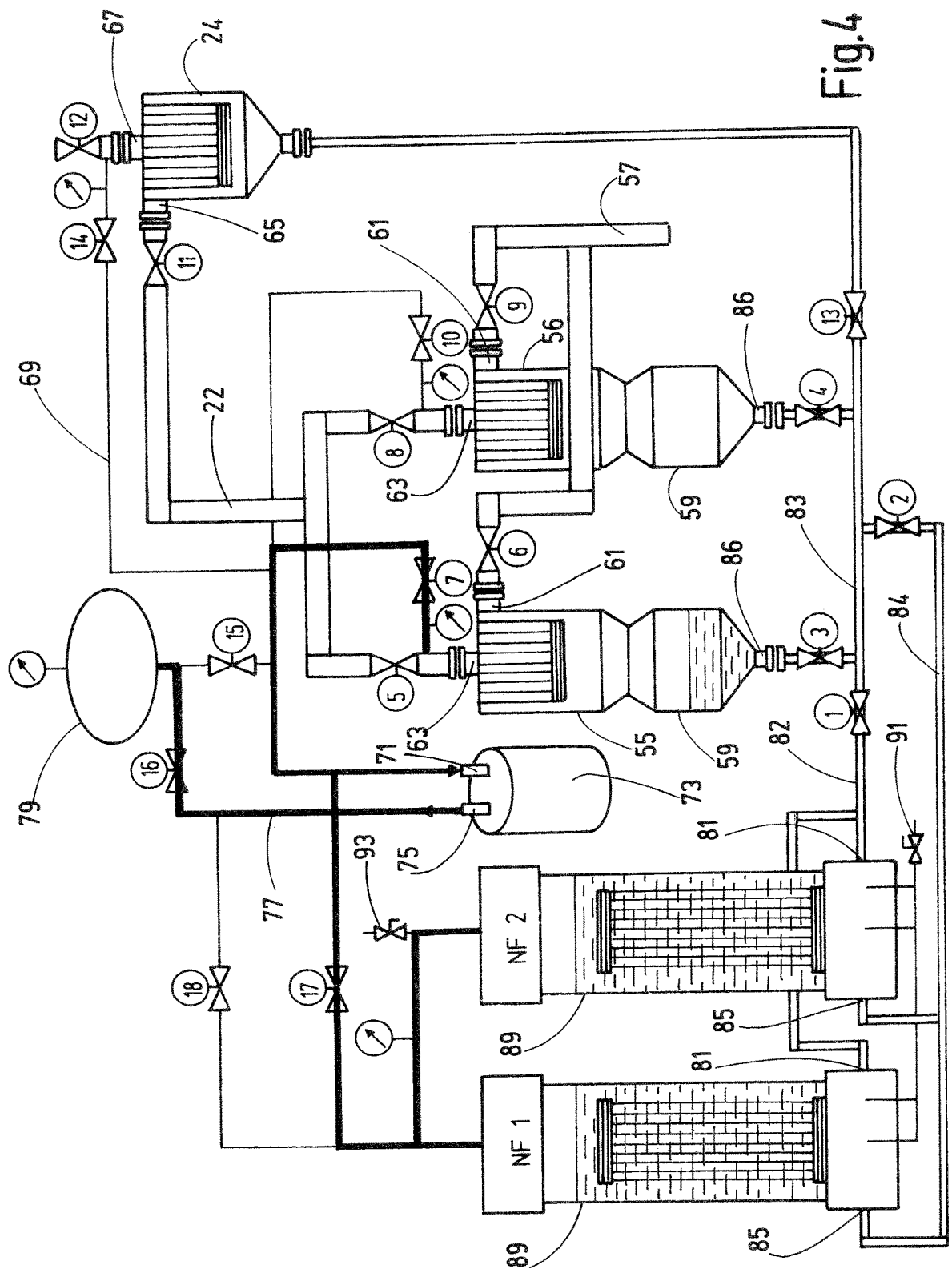
FIGS. 4 to 14 are schematic and highly simplified diagrams of the filter device of FIG. 2, wherein second to twelfth modes of operation are indicated using bold lines.

In the next step in the operating state shown in FIG. 4, in which the second pre-filter 56 is still in filtration mode, the overpressure in the oil filters NF1 and NF2 and in the pre-filter 55 is reduced, which occurs when the receptacle 59 of the first pre-filter 55 was filled. When the shutoff device 5 on the pre-filter 55 is closed, the shutoff device 7 at its filtrate side 63 is opened. When the shutoff device 15 is closed, the filtrate side 63 is connected to the suction side 71 of the compressor 73. At the same time, the housings 89 of the oil filters NF1 and NF2 are also connected to the suction side 71 of the compressor 71 via the open shutoff device 7, whereas the pressure side of the compressor 73 is connected to the pressure accumulator 79 via the open shutoff device 16. When the compressor 73 is running, the oil filters NF1, NF2 and the pre-filter 55 are de-pressurized.

Figure 5:
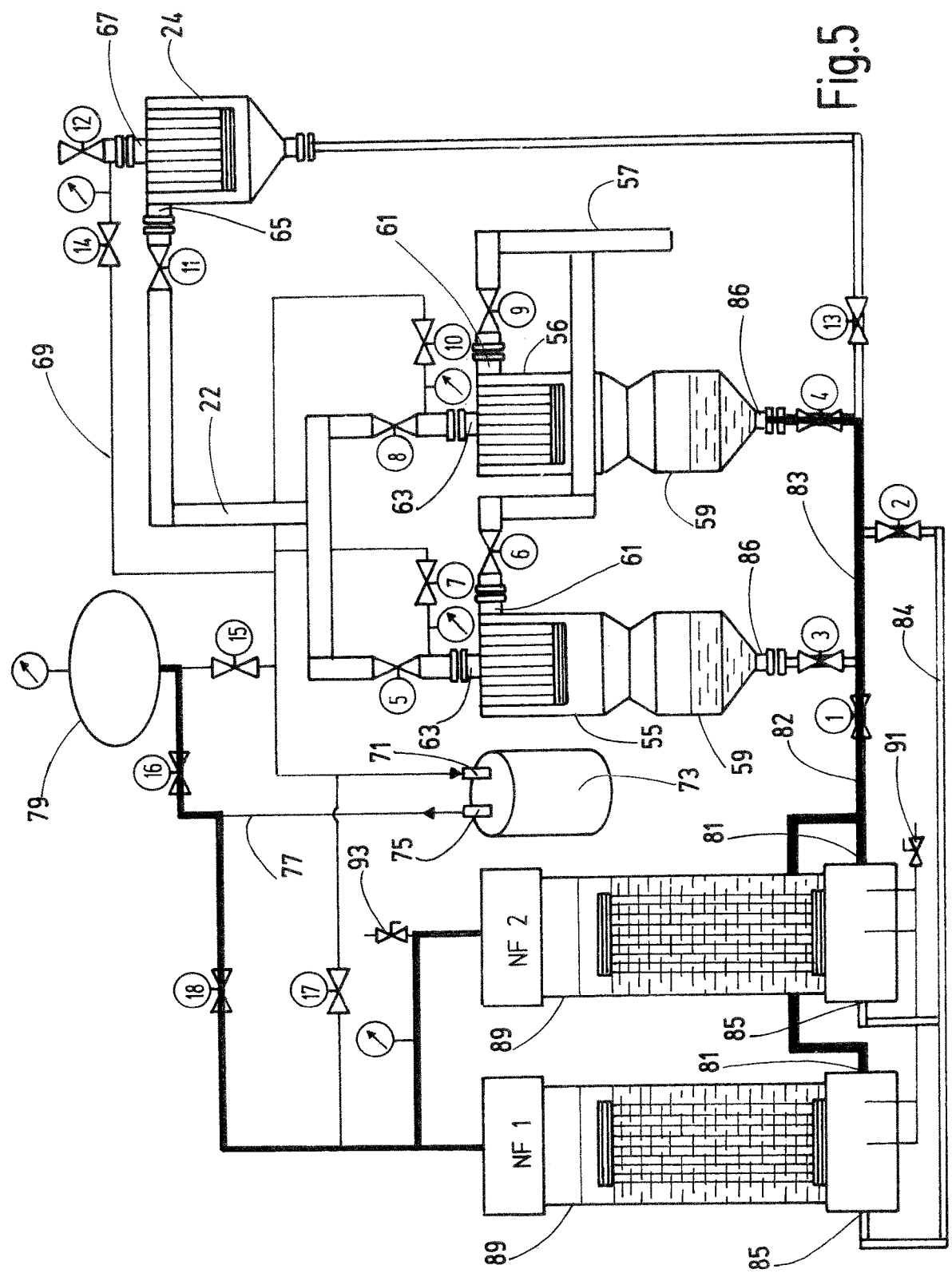

In the further operating state of FIG. 5, in which also only the second pre-filter 56 is in filtration operation, also its receptacle 59 is filled with oil. Due to the open shutoff devices 16 and 18, the housings 89 of the oil filters NF1 and NF2 are again pressurized, such that, when the shutoff devices 1 and 4 are open, the receptacle 59 of the second pre-filter 56 is filled, while the shutoff devices 6 and 5 on the first pre-filter are closed.

Figure 6:
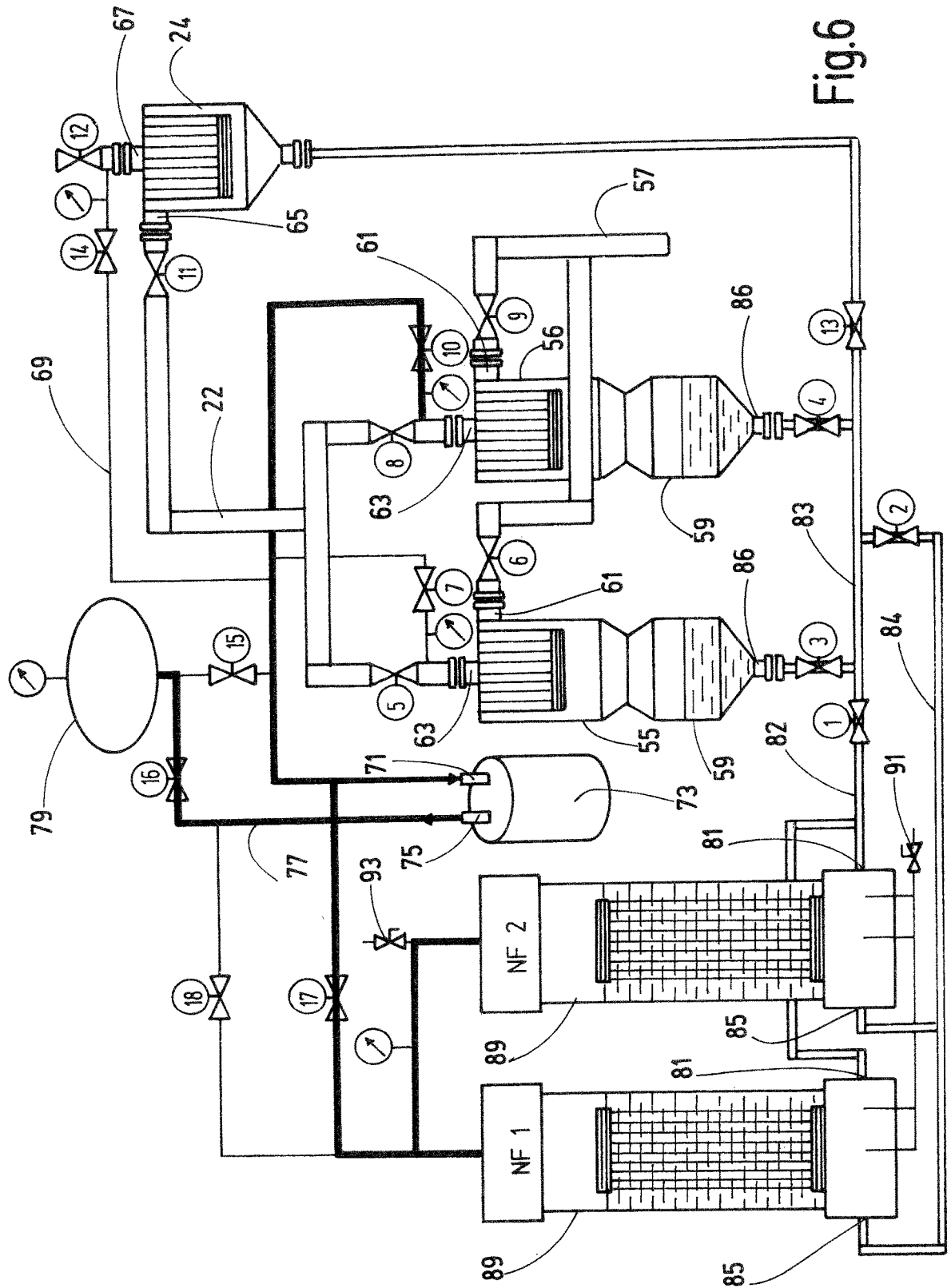

FIG. 6 shows the operating state, in which, in accordance with the operating state of FIG. 4, the overpressure is again removed from the oil filters NF1 and NF2 and also the overpressure in the second pre-filter 55 is removed. For this purpose, the shutoff device 10 on the filtrate side 63 of the pre-filter 56 is open, just as the shut-off valves 16 and 17 are open when the compressor 73 is operating.

Figure 7:
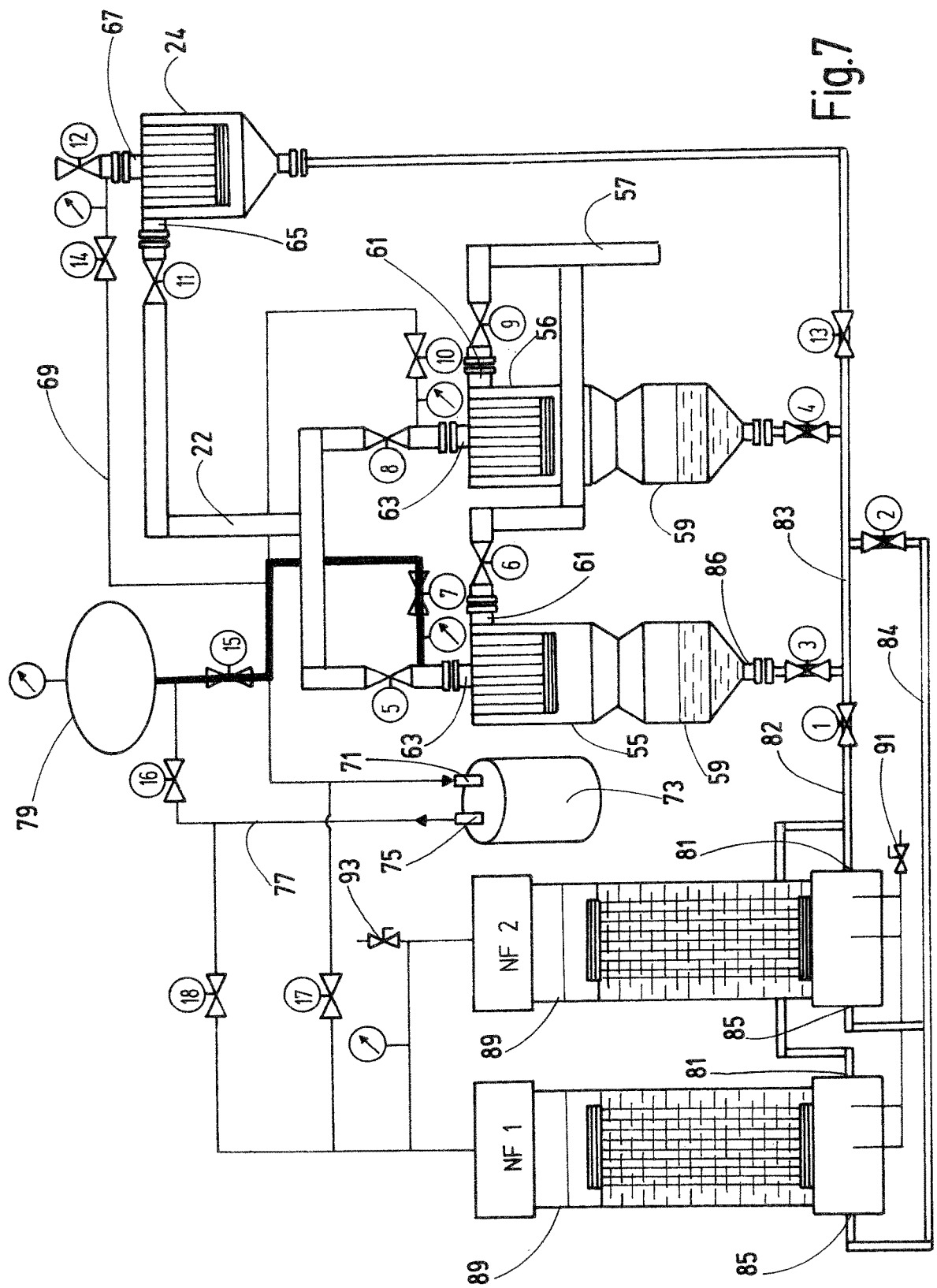

FIG. 7 shows the further operating state, in which the second pre-filter 56 still is in filtration mode, while the first pre-filter 55 is backwashed at the same time. In this case, the shutoff device 7 on the first pre-filter 55 and the shutoff device 15 on the pressure accumulator 79 are open, so that the clean gas from the reservoir 79 flows back in a pressure pulse through the filter material of the pre-filter 55 via the filtrate side 63 of the pre-filter 55. At an accumulator pressure in the range of 6 bar, for instance, effective cleaning takes place.

Figure 8:
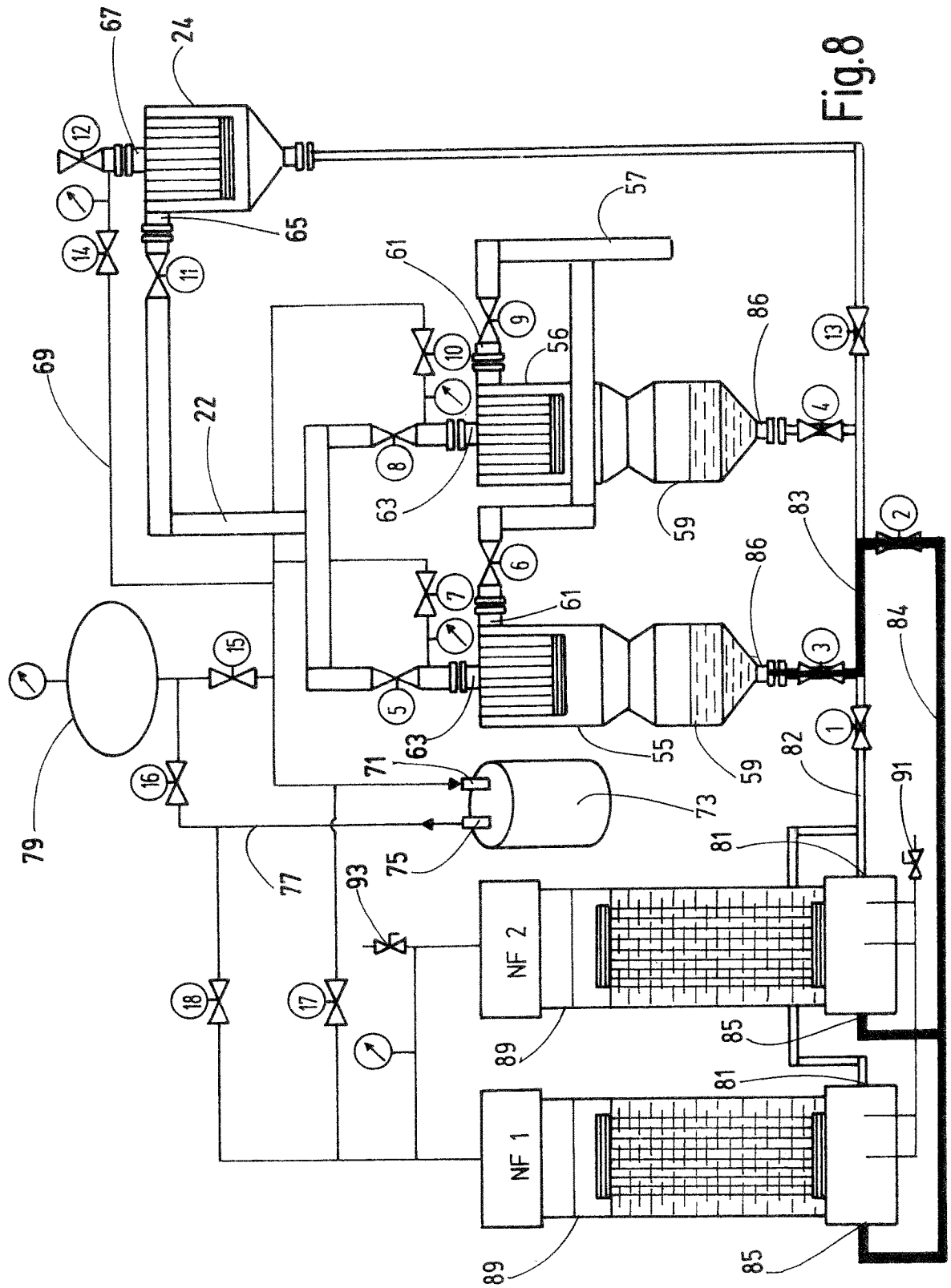

In the further state of FIG. 8, in which the second pre-filter 56 is still in filtration operation, the shutoff device 3 on the receptacle 59 of the first pre-filter 55 and the shutoff device 2 on the connection pipe 83 are open. Because of the pressure existing in the pre-filter 55 during the preceding backwashing process, the oil filling in the receptacle 59, which contains the particles cleaned off during backwashing, is pressed back towards the oil filters NF1, NF2, emptying the receptacle 59 of the first pre-filter 55.

Figure 9:
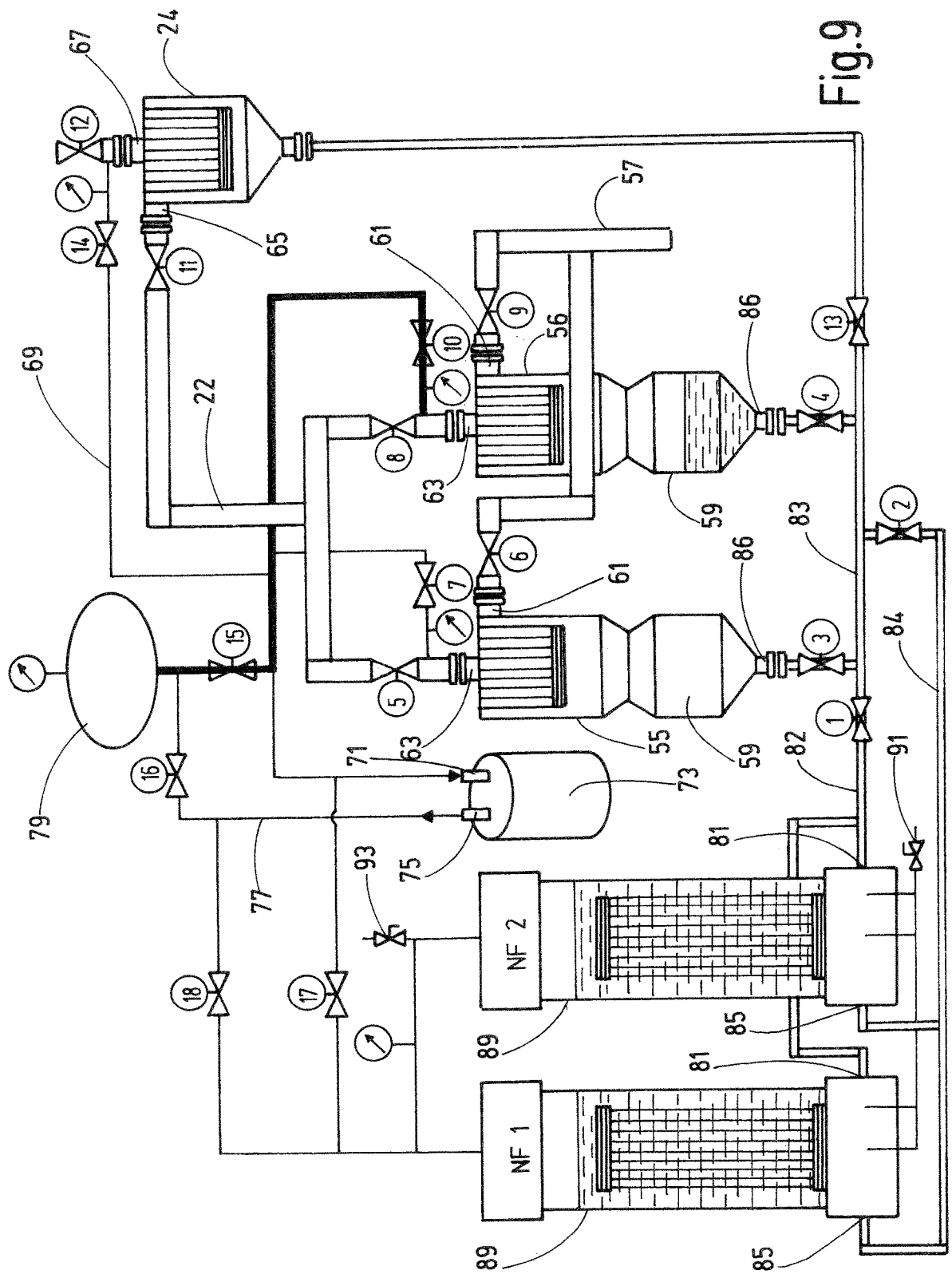

The next operating state shown in FIG. 9 is the backwashing of the second pre-filter 56, whose receptacle 59 is already filled with oil. In this operating state, the first pre-filter 55 is now in filtration mode, as the shutoff device 6 on the unfiltered side 61 and the shutoff device 5 on the filtrate side 63 are open. For the backwashing process of the second pre-filter 56, its shutoff device 9 on the unfiltered side 61 is closed, whereas the shutoff device 10 on the filtrate side 63 is open. For the backwashing process, the clean gas now flows out of the pressure accumulator 79 via the shutoff device 15 on the pressure accumulator 79 and into the second pre-filter 55 as backwashing flow.

Figure 10:
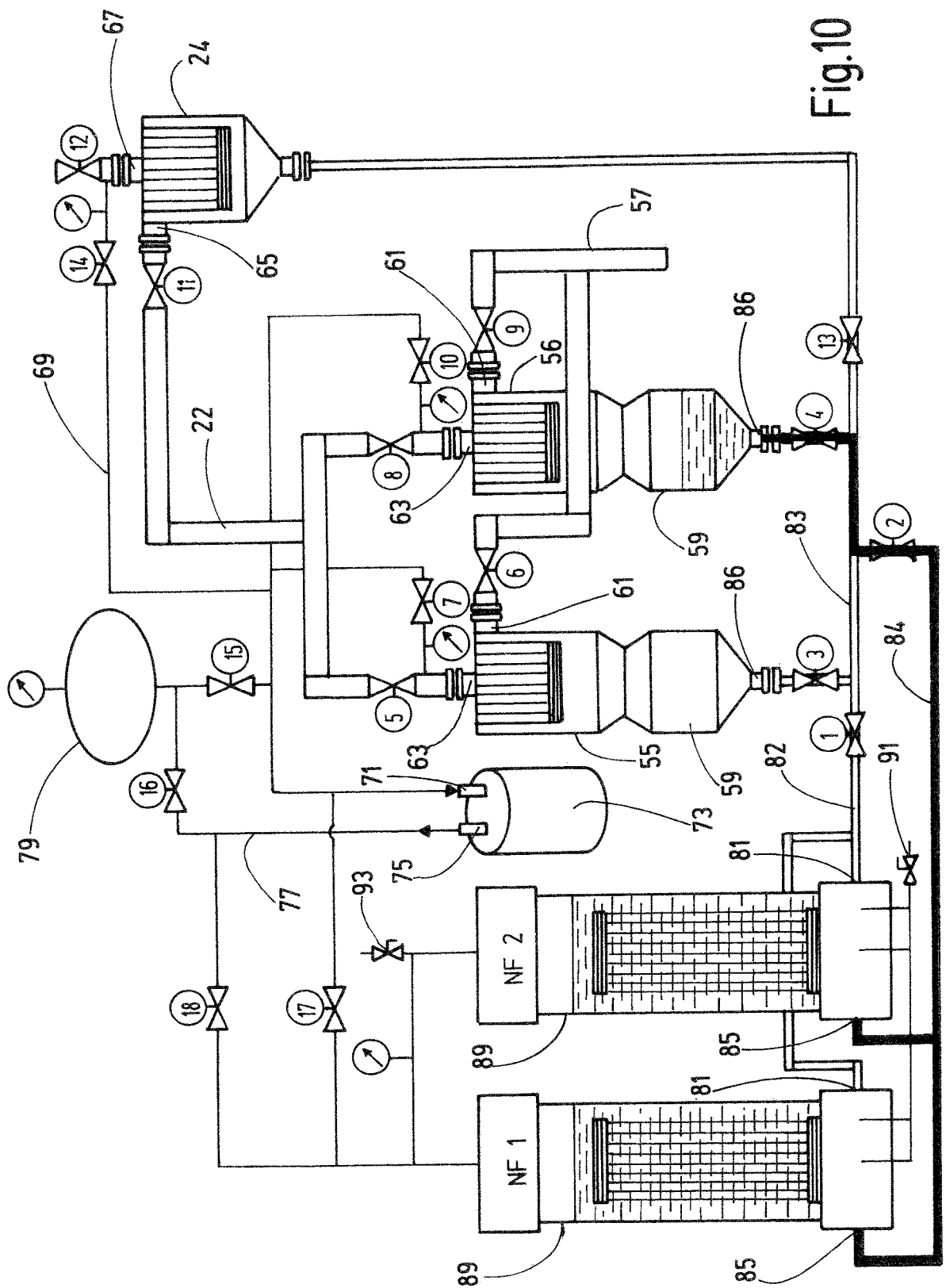

FIG. 10 shows, in analogy with the operating state of FIG. 8, the emptying of the receptacle 59 of the second pre-filter 56. When the first pre-filter 55 is still in filtration operation, the shutoff device 4 on the receptacle 59 of the second pre-filter 56 and the shutoff device 2 on the connection pipe 83 are open, such that the pressure built up in the second pre-filter 56 during backwashing pushes the oil filling of the receptacle 59 back to the oil filters NF1, NF2 and such that the receptacle 59 is emptied of the oil containing the particles cleaned off during the backwashing process.

Figure 11:
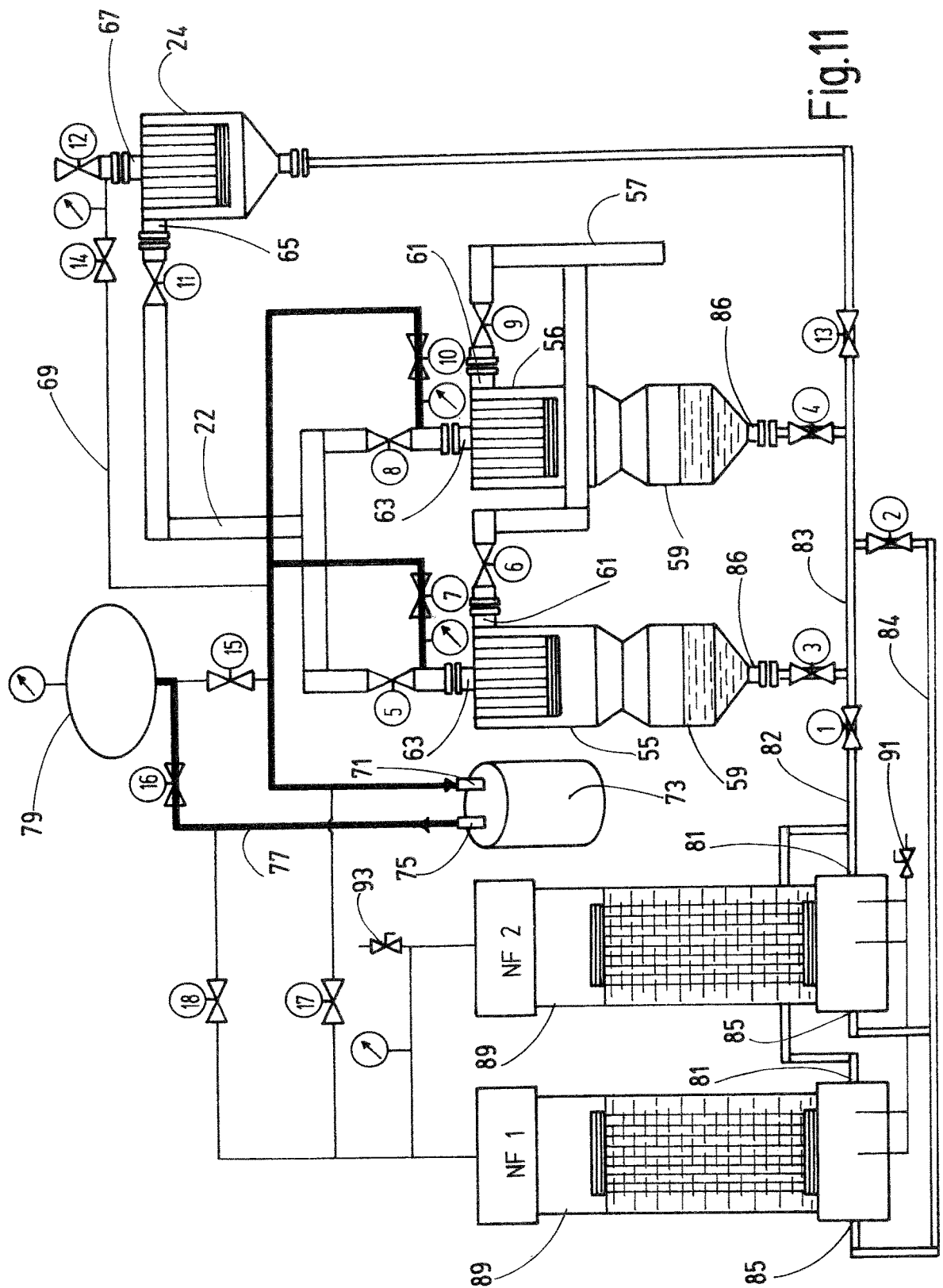

The operating state shown in FIG. 11 is used to prepare the system for performing the passivation of both pre-filters 55 and 56. For this purpose, negative pressure is generated in the housings of the pre-filters 55, 56. For this purpose, the pressure side 75 of the compressor 73 is connected to the pressure accumulator 79 via the open shutoff device 16, while at the same time the suction side 71 of the compressor 73 is connected to the filtrate side 63 of the pre-filters 55 and 56 via the open shutoff devices 7 and 10. When running the compressor 73, because of that running a negative pressure in the housings of the pre-filters 55, 56 is created.

Figure 12:
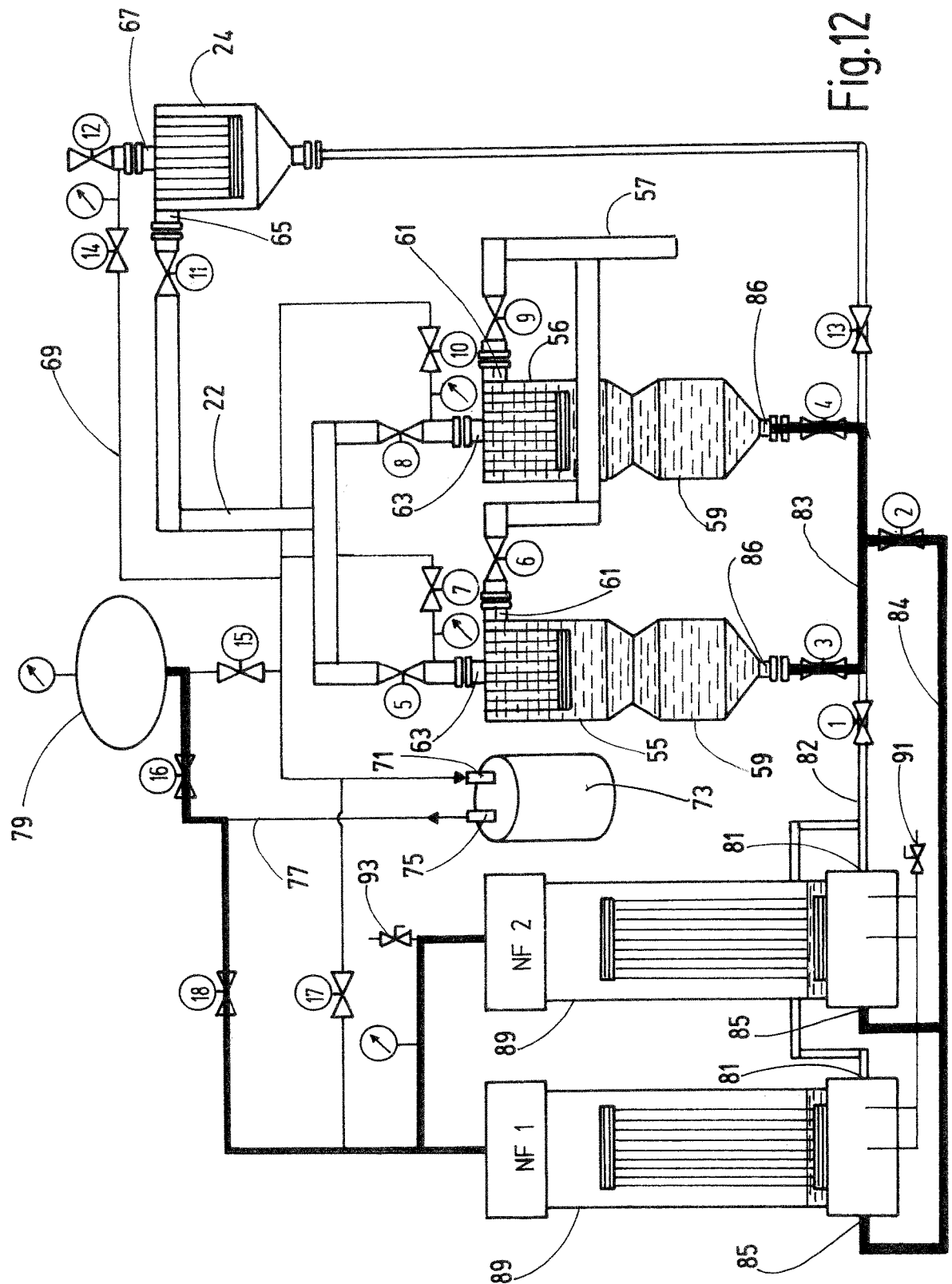

Starting from this state, FIG. 12 shows the passivation of the pre-filters 55, 56. While the shutoff devices 2, 3 and 4 remain open, the shutoff device 16 on the pressure accumulator 79 and the shutoff device 18 assigned to the housings of the oil filters NF1, NF2 are opened. When the negative pressure existing in the housings of the pre-filters 55, 56, because of that negative pressure the oil filling is drawn out of the oil filters NF1 and NF2 and pushed into the pre-filters 55, 56, filling not only their receptacles 59, but also the filter housings with the filter material of the inserting or passivating white oil.

Figure 13:
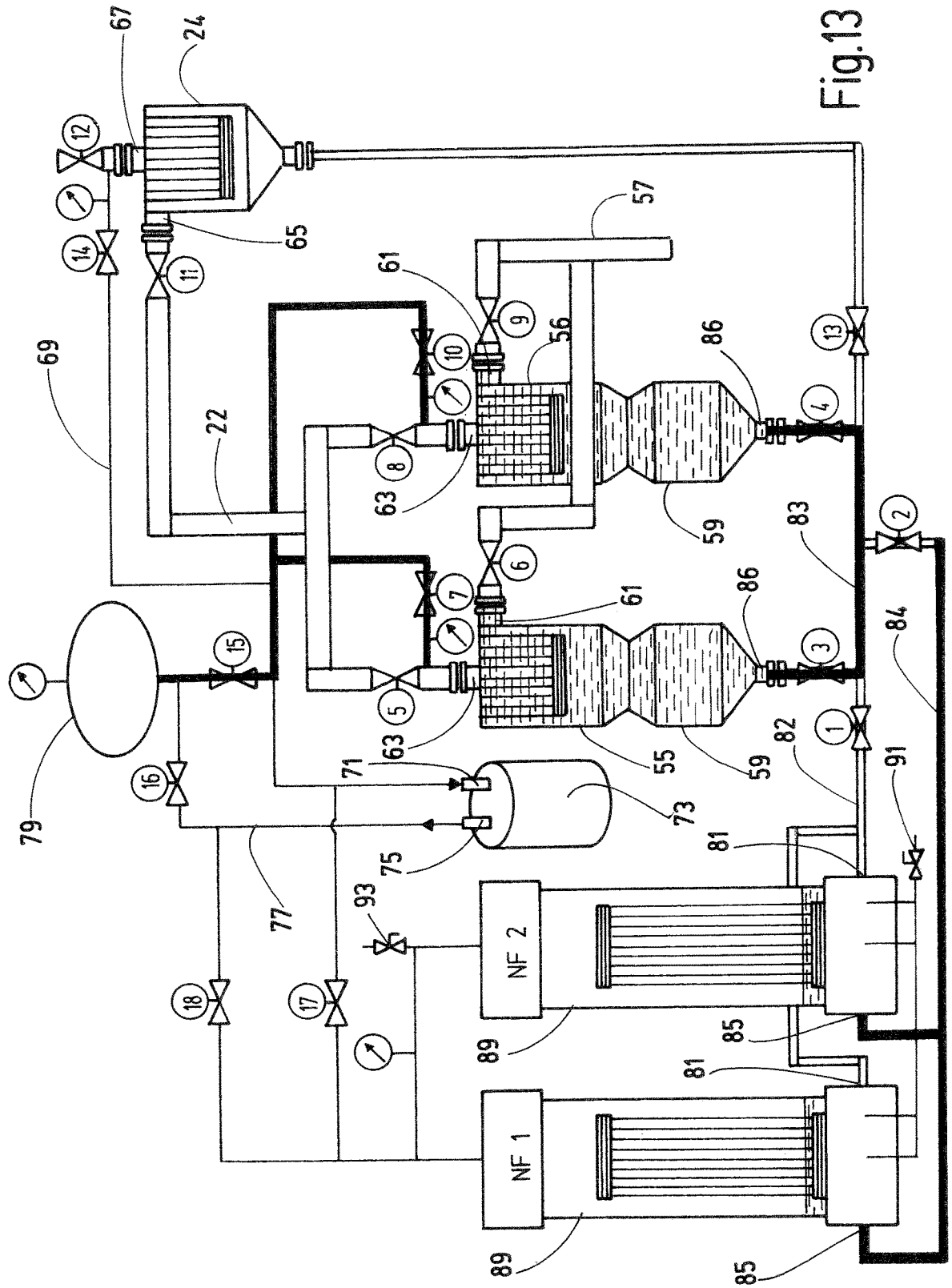

FIG. 13 shows the state of emptying the pre-filters 55 and 56 after passivation. For this purpose, the filtrate sides 63 of the pre-filters 55, 56 are connected to the pressure accumulator 79 via their open shutoff devices 7 and 10 and the open shutoff device 15, such that the housings of the pre-filters 55, 56 are pressurized with the accumulator pressure. When the shutoff devices 2, 3 and 4 are open, because of that opening the filling of the pre-filters 55, 56 is pushed back into the housing of the oil filters NF1 and NF2.

Figure 14:
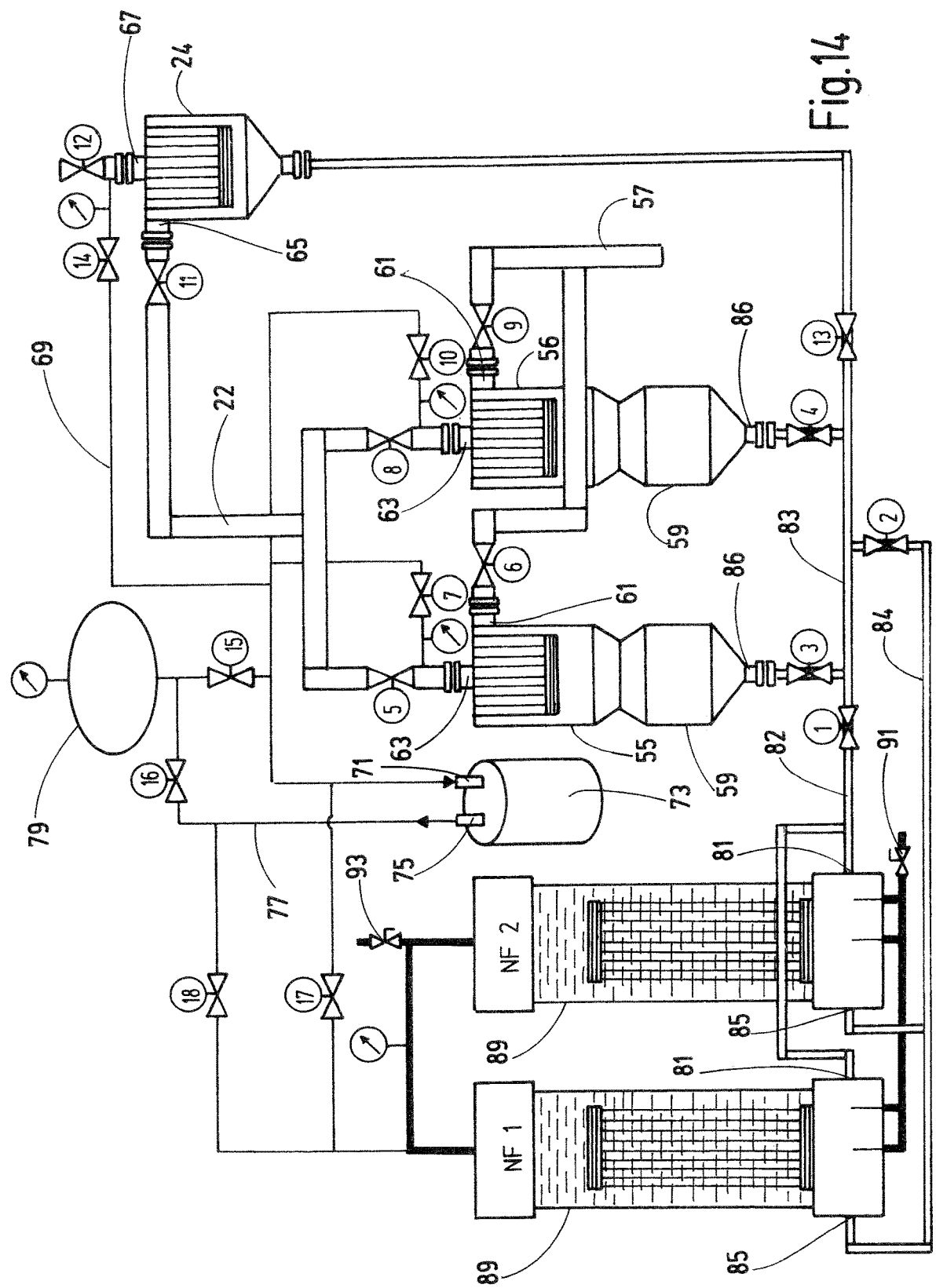

Finally, FIG. 14 shows the state of disposal of the particles cleaned off during the operation of the pre-filters 55 and 56. These are arranged, enclosed by the passivating white oil, in the oil filters NF1, NF2, which are refilled after passivation was completed. For draining the drain valve 91 and a vent valve 93 connected to the housings 89 of the oil filters NF1, NF2 are opened. Because of the passivation of the particles by encasing them in white oil, used filter elements of the oil filters NF1, NF2 can be handled for disposal without the risk of a critical, oxidative reaction of the particles.

While one embodiment has been chosen to illustrate the invention, it will be understood by those skilled in the art that various changes and modifications can be made therein without departing from the scope of the invention as defined in the claims.

The invention claimed is:

1. A filter device for filtering gases contaminated with particles produced in manufacturing processes in a production room, the filter device comprising:
   a first filter circuit being connectable in fluid communication to a gas outlet of the production room, having a first gas filter element capable of filtering the particles from a gas exiting the gas outlet and having a first receptacle connected to the first gas filter element and capable of receiving at least a part of the particles from the first gas filter element; and
   a second filter circuit having a first oil filter element capable of filtering oil with particles obtained in a back-flushing process of the first gas filter element, the first oil filter element having a filtrate side and an unfiltered side connected in fluid communication with the first receptacle such that cleaned oil is capable of flowing from the filtrate side of the first oil filter element to the first receptacle and such that oil contaminated with the particles is capable of flowing to the unfiltered side of the first oil filter element from the first receptacle.

2. The filter device according to claim 1 wherein
the first circuit comprises a pressure accumulator connectable in fluid communication with and pressurized with a gas of a pre-determinable pressure by a compressor for the backwashing process; and
the filter device further comprises a gas supply circuit for the production room having a clean side connected in fluid communication with and providing the gas to the compressor during the back-flushing process in reversal of a usual filtration direction initiating back-flushing at the first gas filter element.

3. The filter device according to claim 2 wherein
the filter device further comprises a main filter connected to the supply circuit for the production room, a filtrate side of the main filter being connected in fluid communication with and suppling clean gas at an inlet of the production room, an unfiltered side of the main filter being connected to a filtrate side of the first gas filter element.

4. The filter device according to claim 2 wherein
for passivating the first gas filter element and the first receptacle, conduits in fluid communication with the pressure accumulator and the first oil filter element convey pressure from the pressure accumulator that acts on the first oil filter element, the oil of the first oil filter element being white oil and being flowable through the first gas filter element and the first receptacle after being cleaned of particles.

5. The filter device according to claim 3 wherein
for filling the first gas filter element and the first receptacle with the oil, conduits in fluid communication with the first gas filter element, the first receptacle and the compressor apply a vacuum to the first gas filter element and the first receptacle.

6. The filter device according to claim 3 wherein
the first filter circuit has a second gas filter element capable of filtering the particles from the gas and has a second receptacle connected to the second gas filter element and capable of receiving at least a part of the particles from the second gas filter element, the first and second gas filter elements being arranged as pre-filters upstream of the main filter and having unfiltered sides connectable in fluid communication to a dirt side of the supply circuit; and
the second filter circuit has a second oil filter element capable of filtering oil with particles obtained in a flushing process of the first and/or second receptacle.

7. The filter device according to claim 6 wherein
the second oil filter element has a filtrate side and an unfiltered side connected in fluid communication with the first or second receptacle such that cleaned oil is capable of flowing from the filtrate side of the second oil filter element to the first and/or second receptacle and such that oil contaminated with the particles is capable of flowing to the unfiltered side of the first or second oil filter element from the first and/or second receptacle.

8. The filter device according to claim 1 wherein
the first gas filter element is replaceably mounted in a filter housing, the filter housing having a discharge for removing the oil from the filter housing for replacing the first gas filter element.

9. The filter device according to claim 3 wherein
a blow pump is in the supply circuit downstream of the main filter;
a gas cooler is in the supply circuit downstream of the blow pump; and
a supply is connected in fluid communication to the inlet of the production room to feed gas into the production room.

10. The filter device according to claim 9 wherein
the gas of the supply is a protective gas of nitrogen or argon.

11. A filter device for filtering gases contaminated with particles produced in manufacturing processes in a production room, the filter device comprising:
a first filter circuit having a first gas filter element capable of filtering the particles from the gas and having a first receptacle connected to the first gas filter element and capable of receiving at least a part of the particles from the first gas filter element;
a second filter circuit having a first liquid filter element capable of filtering liquid with particles conveyed from the first receptacle, the particles being obtained in a back-flushing process of the first gas filter element and the first receptacle; and
a main filter is connected to a gas supply circuit for the production room, a filtrate side of the main filter being connectable in fluid communication with and suppling clean gas at an inlet of the production room, an unfiltered side of the main filter being connected to a filtrate side of the first gas filter element.

12. The filter device according to claim 11 wherein
the first circuit comprises a pressure accumulator connectable in fluid communication with and pressurized with a gas of a pre-determinable pressure by a compressor for the backwashing process; and
a gas supply circuit is connectable in fluid communication with the production room and has a clean side connected in fluid communication with and providing the gas to the compressor during the back-flushing process in reversal of a usual filtration direction initiating back-flushing at the first gas filter element e.

13. A filter device for filtering gases contaminated with particles produced in manufacturing processes in a production room, the filter device comprising:
a first filter circuit having a first gas filter element capable of filtering the particles from the gas and having a first receptacle connected to the first gas filter element and capable of receiving at least a part of the particles from the first gas filter element;
a second filter circuit having a first liquid filter element capable of filtering liquid with particles obtained in a back-flushing process of the first gas filter element and the first receptacle; and
a blow pump is in a gas supply circuit downstream of a main filter and connected in fluid communication to the first gas filter element and connectable to an inlet of the production room to feed gas into the production room; and
a gas cooler is in the gas supply circuit downstream of the blow pump.

14. The filter device according to claim 13 wherein
the gas of the supply is a protective gas of nitrogen or argon.

15. The filter device according to claim 13 wherein
a filtrate side of
the main filter is connectable in fluid communication with and supplies clean gas at the inlet of the production room, an unfiltered side of the main filter being connected to the filtrate side of the first gas filter element.

16. The filter device according to claim 13 wherein
the first circuit comprises a pressure accumulator is connectable in fluid communication with and pressurized with a gas of a pre-determinable pressure by a compressor for the backwashing process; and
the gas supply circuit connectable to the production room has a clean side connected in fluid communication with and providing the gas to a compressor during the back-flushing process in reversal of a usual filtration direction initiating backwashing at the first gas filter element.

17. A filtering system for filtering gases contaminated with particles produced in manufacturing processes, the filtering system comprising:
a production room having a gas inlet connected to a gas supply circuit and a gas outlet; and
a filter device including
a first filter circuit being connected in fluid communication to the gas outlet of the production room, having a first gas filter element capable of filtering the particles from a gas exiting the gas outlet and having a first receptacle connected to the first gas filter element and capable of receiving at least a part of the particles from the first gas filter element; and
a second filter circuit having a first oil filter element capable of filtering oil with particles obtained in a back-flushing process of the first gas filter element, the first oil filter element having a filtrate side and an unfiltered side connected in fluid communication with the first receptacle such that cleaned oil is capable of flowing from the filtrate side of the first oil filter element to the first receptacle and such that oil contaminated with the particles is capable of flowing to the unfiltered side of the first oil filter element from the first receptacle.

18. The filtering system device according to claim 17 wherein
the first circuit comprises a pressure accumulator connectable in fluid communication with and pressurized with a gas of a pre-determinable pressure by a compressor for the backwashing process; and
the gas supply circuit for the production room has a clean side connected in fluid communication with and providing the gas to the compressor during the back-flushing process in reversal of a usual filtration direction initiating back-flushing at the first gas filter element.

19. The filtering system according to claim 17 wherein
a main filter is connected to the gas supply circuit, a filtrate side of the main filter being connected in fluid communication with and suppling clean gas the gas inlet of the production room, an unfiltered side of the main filter being connected to a filtrate side of the first gas filter element.

20. The filtering system according to claim 18 wherein
for passivating the first gas filter element and the first receptacle, conduits in fluid communication with the pressure accumulator and the first oil filter element convey pressure from the pressure accumulator that acts on the first oil filter element, the oil of the first oil filter element being white oil and being flowable through the first gas filter element and the first receptacle after being cleaned of particles.

21. The filtering system according to claim 18 wherein
for filling the first gas filter element and the first receptacle with the oil, conduits in fluid communication with the first gas filter element, the first receptacle and the compressor apply a vacuum to the first gas filter element and the first receptacle.

22. The filtering system according to claim 19 wherein
the first filter circuit has a second gas filter element capable of filtering the particles from the gas and has a second receptacle connected to the second gas filter element and capable of receiving at least a part of the particles from the second gas filter element, the first and second gas filter elements being arranged as pre-filters upstream of the main filter and having unfiltered sides connectable in fluid communication to a dirt side of the supply circuit; and
the second filter circuit has a second oil filter element capable of filtering oil with particles obtained in a flushing process of the first and/or second receptacle.

23. The filter device according to claim 22 wherein
the second oil filter element has a filtrate side and an unfiltered side connected in fluid communication with the first or second receptacle such that cleaned oil is capable of flowing from the filtrate side of the second oil filter element to the first and/or second receptacle and such that oil contaminated with the particles is capable of flowing to the unfiltered side of the first or second oil filter element from the first and/or second receptacle.

24. The filter device according to claim 19 wherein
a blow pump is in the gas supply circuit downstream of the main filter; and
a gas cooler is in the gas supply circuit downstream of the blow pump.

* * * * *